No. 852,793. PATENTED MAY 7, 1907.
H. C. LADISH.
FISH HOOK.
APPLICATION FILED FEB. 4, 1907.
2 SHEETS—SHEET 1.
Fig. 1.
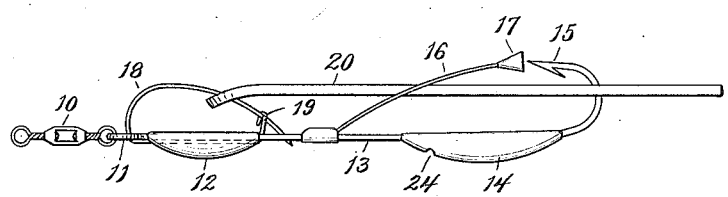
Fig. 2.
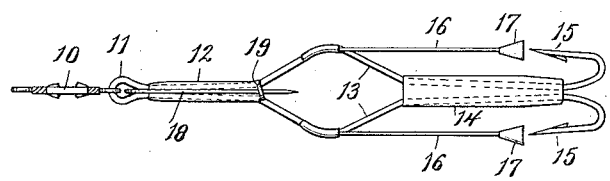
Fig. 3. Fig. 4.
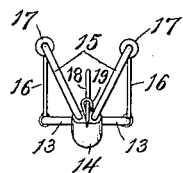 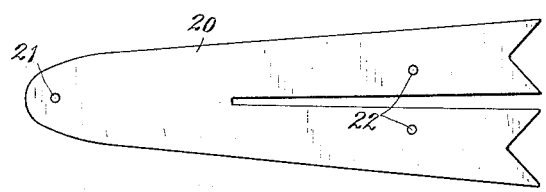
Witnesses:
C. H. Keeney
Anna F. Schmittbauer
Inventor:
Herman C. Ladish,
By Benedict, Morsell & Caldwell,
Attorneys.

No. 852,793. PATENTED MAY 7, 1907.
H. C. LADISH.
FISH HOOK.
APPLICATION FILED FEB. 4, 1907.

2 SHEETS—SHEET 2.

Witnesses.
Inventor.
Herman C. Ladish,
By Benedict, Morsell & Caldwell,
Attorneys.

UNITED STATES PATENT OFFICE.

HERMAN C. LADISH, OF MILWAUKEE, WISCONSIN.

FISH-HOOK.

No. 852,793.  Specification of Letters Patent.  Patented May 7, 1907.

Application filed February 4, 1907. Serial No. 355,551.

*To all whom it may concern:*

Be it known that I, HERMAN C. LADISH, residing in Milwaukee, in the county of Milwaukee and State of Wisconsin, have invented new and useful Improvements in Fish-Hooks, of which the following is a description, reference being had to the accompanying drawings, which are a part of this specification.

This invention has for its object to provide a fish hook which will be capable of carrying live or artificial bait in an attractive manner without liability of the bait becoming loose or being torn away.

Another object of this invention is to provide such a fish hook of a construction that will be thoroughly weedless.

With the above and other objects in view the invention consists in the fish hook herein claimed, its parts and combinations of parts and all equivalents.

Figure 5:
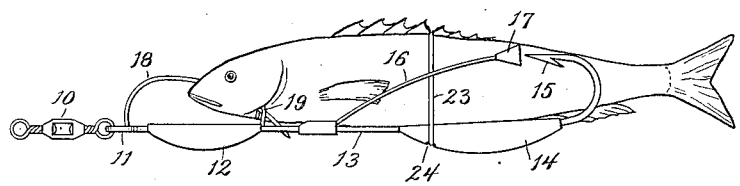

Referring to the accompanying drawings, in which like characters of reference indicate the same parts in the several views; Figure 1 is a side elevation of a fish hook constructed in accordance with this invention; Fig. 2 is a plan view thereof; Fig. 3 is a rear end elevation thereof; Fig. 4 is a view of a pork rind bait particularly designed for use in connection with the fish hook of this invention; Fig. 5 is a side elevation of the fish hook of this invention when used with a minnow as bait; and, Fig. 6 is a plan view thereof when used with a frog as bait.

In these drawings 10 represents an ordinary swivel which is connected to the eye loop 11 of a frame wire which is bent at its middle portion to form said eye loop, with its two members running together for a short distance and soldered together with the solder depending therefrom and forming a rounded front weight 12, said members then diverging for a short distance and converging to form an open frame 13 of approximately a diamond shape, said members then continuing together for a distance and united by solder which depends therefrom and forms a rear weight 14 similar to but larger than the front weight, and from the rear weight the members bend upwardly and divergently to form a pair of hook members 15. To each of the side shoulders of the open frame 13 is secured by solder or otherwise a light spring guard wire 16 carrying a conical guard 17 on its end standing directly in front of the point of hook 15 on that side.

A spring wire is embedded in the front weight 12 together with the frame wire members and at its front end it is bent upwardly and rearwardly to form a spring needle 18 and at its rear end it is bent to form a hook 19 for engaging said needle and holding it in a lower position against its tendency to spring upwardly.

Figure 6:
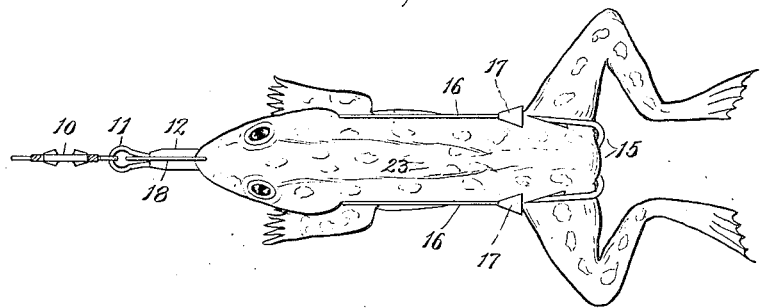

While the fish hook of this invention is preferred for use with the pork rind bait 20, shown in Figs. 1 and 4, it is equally adapted for use with other bait as shown in Figs. 5 and 6. The pork rind bait 20 consists of a U-shaped strip of the white fatty portion of pork skin with a perforation 21 in its rounded front end to receive the pin 18, as shown in Fig. 1, and perforations 22 in the two rearwardly extending portions thereof to fit on the hooks 15, the bait passing between the guard wires 16 and not interfering therewith. When the hook provided with this bait is drawn through the water the weights 12 and 14 keep it in its proper position while the effect of the movement of the hook through the water causes the bait 20 to wave and attract the attention of the fish. The bait is very durable and is not capable of being accidentally detached from the needle 18 so it may be used indefinitely.

When it is desired to use the fish hook of this invention with minnows, the needle 18 is passed through the upper jaw and out through the gills and is engaged with the hook 19 as shown in Fig. 5, the minnow then being supported on the body portion of the hook between the hook member 15 and between the guard wires 16. A cord 23 may be passed around the body of the minnow and through a notch 24 in the under side of the rear weight 14 to hold the minnow in place if desired.

When it is desired to use the hook of this invention with frogs as bait, the needle 18 is passed through the upper jaw and out of the lower jaw of the frog and is engaged with hook 19, the body of the frog being held between and beneath the guard wires 16 with the legs passing through the hook members 15. In this arrangement the guards are not interfered with and the frog is free to move its legs in the usual manner and will therefore appear more natural in moving through the water and will be kept alive for a very long time. The frog may also be secured by the cord 23 if desired, but this is usually unnecessary.

While I have shown and described the preferred manner of constructing the fish hook of this invention, by a single wire forming the eye loop 11, the open frame 13 and the hook members 15, it is obvious that the invention is not confined to such method of construction but may be otherwise formed without departing from the spirit and scope thereof.

What I claim as my invention is;

1. A fish hook, comprising a pair of divergent hook members, an open frame in advance of and connected with said hook members, guards secured to the outer edges of the open frame and guarding the ends of the hook members, and a needle carried by the open frame.

2. A fish hook, comprising a pair of hook members, a rear weight connected to the hook members, an open frame in advance of the rear weight, guards mounted on the outer edges of the open frame and guarding the ends of the hook members, a front weight in advance of the open frame, and a needle carried by the front weight.

3. A fish hook, comprising a wire bent to form an eye loop at its front end with its members running together for a short distance therefrom and then diverging and converging to form an open frame at the intermediate portion of the hook and then continuing rearwardly together for a distance and finally being bent upwardly and divergently to form a pair of hook members, guards mounted on the open frame for guarding the hook members, and means connected with the wire for securing bait thereto.

4. A fish hook, comprising a wire bent to form an eye loop at its front end with its members running together for a short distance therefrom and then diverging and converging to form an open frame at the intermediate portion of the hook and then continuing rearwardly together for a distance and finally being bent upwardly and divergently to form a pair of hook members, guards mounted on the open frame for guarding the hook members, and a spring wire secured to the portion of said wire where the members come together between the eye loop and the open frame and constituting a spring needle and a retaining hook for engaging bait.

5. A fish hook, comprising a wire bent to form an eye loop at its front end with its members running together for a short distance therefrom and then diverging and converging to form an open frame at the intermediate portion of the hook and then continuing rearwardly together for a distance and finally being bent upwardly and divergently to form a pair of hook members, guards mounted on the open frame for guarding the hook members, a spring wire secured to the portion of said wire where the members run together between the eye loop and the open frame and forming a spring needle bent upwardly and rearwardly for passing through a bait and a hook for engaging said needle, a front weight at said portion of the wire, and a rear weight at the portion of the wire between the open frame and the hook members.

6. A fish hook, comprising a wire bent to form an eye loop at its front end with its members running together for a short distance therefrom and then diverging and converging to form an open frame at the intermediate portion of the hook and then continuing rearwardly together for a distance and finally being bent upwardly and divergently to form a pair of hook members, guards mounted on the open frame guarding the hook members, a depending head weight formed by solder uniting the members of the wire between the eye loop and the open frame, a rear weight formed by solder uniting the wire members between the open frame and the hook members, and a spring wire embedded in the front weight with one end bent rearwardly and forming a needle for passing through the bait and the other end forming a hook for engaging the needle.

In testimony whereof, I affix my signature, in presence of two witnesses.

HERMAN C. LADISH.

Witnesses:
R. S. C. CALDWELL,
ANNA F. SCHMIDTBAUER.